G. D. ROLLINS.
HOOK AND EYE.
APPLICATION FILED MAY 7, 1912.
1,115,112.
Patented Oct. 27, 1914.
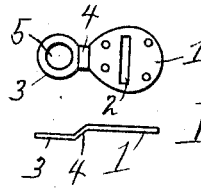
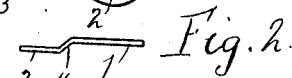
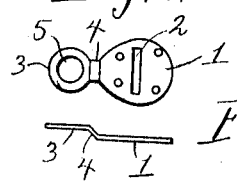
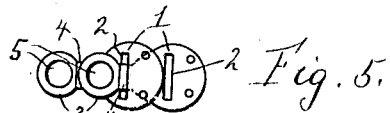
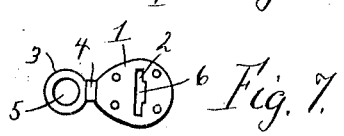
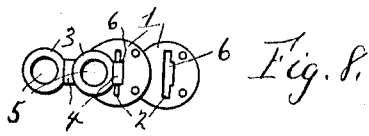
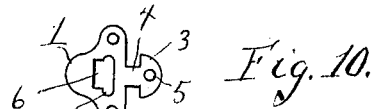
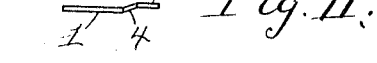
Witnesses
M. P. Williamson
M. H. LoRee
Inventor
George D. Rollins
By W. W. Williamson
Attorney

UNITED STATES PATENT OFFICE.

GEORGE D. ROLLINS, OF PHILADELPHIA, PENNSYLVANIA.

HOOK AND EYE.

1,115,112.  Specification of Letters Patent.  Patented Oct. 27, 1914.

Application filed May 7, 1912. Serial No. 695,643.

*To all whom it may concern:*

Be it known that I, GEORGE D. ROLLINS, a citizen of the United States, residing at Philadelphia, in the county of Philadelphia and State of Pennsylvania, have invented new and useful Improvements in Hooks and Eyes, of which the following is a specification.

My invention relates to new and useful improvements in hooks and eyes or garment fasteners, and has for its object to provide an exceedingly simple and effective device of this description which while it is especially adapted for use as a hook and eye, might be used for various other purposes such as a corset clasp and the like.

A further object of my invention is to so construct the device that it may be made from sheet metal and each member serve the function of either the hook or eye, thus requiring the manufacture of but one member which is reversible and may be used in both capacities.

With these ends in view, this invention consists in the details of construction and combination of elements hereinafter set forth and then specifically designated by the claim.

In order that those skilled in the art to which this invention appertains may understand how to make and use the same, I will describe its construction in detail, referring by numeral to the accompanying drawing forming a part of this specification, in which—

Figure 1, is a plan view of one form of my invention, showing it as the eye. Fig. 2, an edge view of Fig. 1. Fig. 3, a view similar to Fig. 1, showing a device to be used as a hook for insertion in the eye portion of Fig. 1. Fig. 4, an edge view of Fig. 3. Fig. 5, a plan view showing two of the devices, one serving as the eye and the other as the hook secured together. Fig. 6, an edge view of Fig. 5. Fig. 7, a plan view showing a slightly modified form of my invention. Fig. 8, a similar view showing two of the devices hooked together. Fig. 9, an edge view of Fig. 8, Fig. 10, a plan view of another design of body, and Fig. 11, an edge view thereof.

In carrying out my invention as embodied in Figs. 1 to 6 inclusive, I form the device with a body 1, in which is a slot 2, which slot serves the two fold purpose of an eye for the engagement of the hook and for sewing the device to the garment. With the body 1, is formed a head 3, joined to the body by a neck 4, which latter is so bent as to cause the body and head to lie in different parallel planes as clearly shown in Figs. 2 and 4. The head has an opening 5 therein for convenience in sewing it to the garment.

From this description it will be seen that when the device is secured to one edge of the garment, by sewing through the opening 5 and around the neck 4, leaving the body 1 to serve as an eye, while another of the devices is secured to the opposite edge of the garment by sewing through the slot 2 and around the neck 4 leaving the head free to be inserted in the slot 2 and serve as a hook. The body and head being off set by the angle of the neck as before stated, will facilitate the engagement of the two members and cause them to lie flat upon the goods so as to in no wise interfere with ironing the garment as pressure exerted upon the device in its flat condition will not collapse or mash it.

In the construction just described, the bent neck serves to hold the hook and eye in engagement but in Figs. 7 to 9, inclusive, I form an extension 6 in the slot 2 in which the neck 4 is drawn when the devices are engaged, permitting the head to pass slightly over the edge of the slot 1, and thus more securely lock the hook and eye together.

Of course the device can be made in various designs and of any suitable material, but I prefer to make it of thin sheet metal when it is to be used in place of the ordinary hook and eye and this will permit them to be stamped with one operation by an automatic press which will reduce the production an appreciable amount, while producing an exceedingly effective and attractive device.

Of course I do not wish to be limited to the exact details of construction as here shown as these may be varied within the limits of the appended claims without departing from the spirit of my invention.

Having thus fully described my invention, what I claim as new and useful, is—

In a device of the character stated, a fastener adapted to be used either as a hook or as an eye in making up two part fasteners comprising a body having a transverse slot and provided with perforations, a head provided with an opening, said head lying in a different parallel plane to the body and being of less width than the length of said slot, and a neck standing at an angle for connecting the body and head, whereby, in one position of the fastener, said body is adapted to be sewed to a fabric through said slot and perforations and said hook and neck are adapted to engage through the eye of a complementary fastener, while in the reverse position of the fastener, said hook is adapted to be sewed to a fabric through said opening and around said neck and said body is spaced from the fabric and serves as a slotted eye member adapted to be engaged by the tongue-shaped hook of a complementary fastener.

In testimony whereof, I have hereunto affixed my signature in the presence of two subscribing witnesses.

GEORGE D. ROLLINS.

Witnesses:
MARY E. HAMER,
M. H. LO REE.